Sept. 25, 1962  G. I. WOOD ET AL  3,055,438
TURF EDGER
Filed May 12, 1960  2 Sheets-Sheet 2
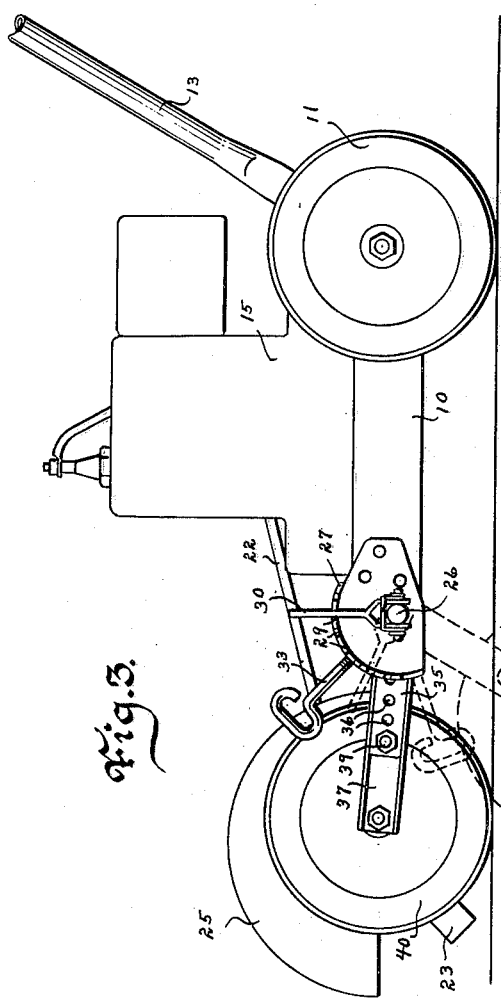
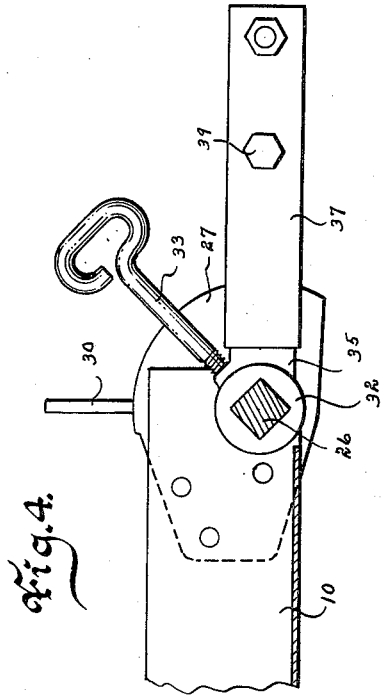
Inventors
George I. Wood &
Wayne M. Wistrom
by Talbert Dick & Zarley
Attorneys
Witness
Edward P. Seeley

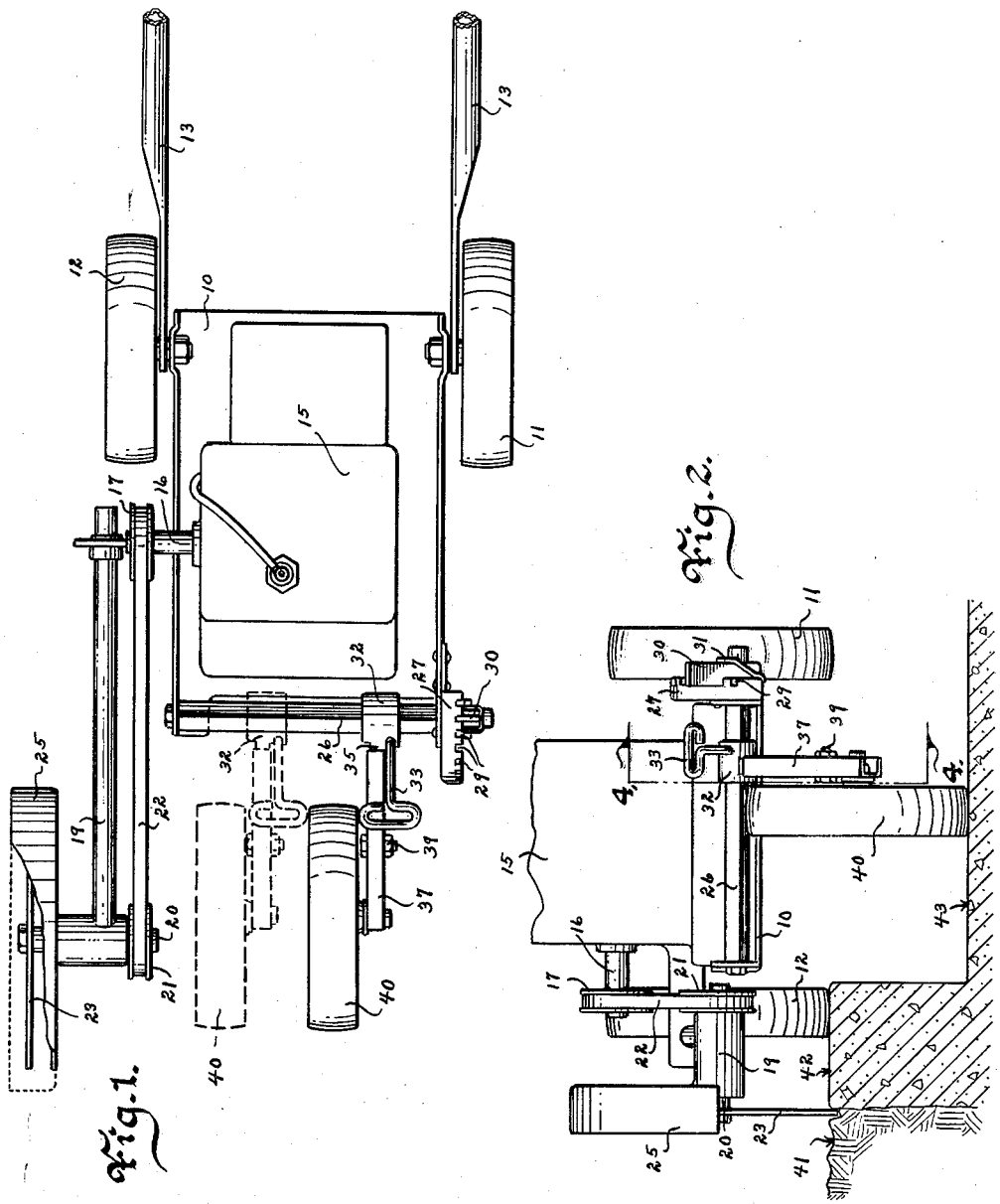

United States Patent Office 3,055,438
Patented Sept. 25, 1962

3,055,438
TURF EDGER
George I. Wood and Wayne M. Wistrom, Des Moines, Iowa, assignors to Western Tool and Stamping Company, Des Moines, Iowa, a corporation of Iowa
Filed May 12, 1960, Ser. No. 28,754
3 Claims. (Cl. 172—15)

This invention relates to turf or grass edgers normally used to cut the turf or grass adjacent curbs, sidewalks or like.

The use of edgers is old. Most edgers consist of a wheel supported frame, a prime mover on the frame, and a rotatable cutting blade operatively connected to the prime mover. Usually the wheels of the device roll on the adjacent sidewalk or the like. The difficulty experienced heretofore with such devices is that the sidewalk or its curb does not always lie in the proper horizontal plane for supporting the wheels of the edger. This is especially true if the roadway, curb, walk or like adjacent to the lawn has more than one horizontal plane surface, or if it slopes in a lateral direction from the turf or grass to be cut.

Therefore, one of the principal objects of our invention is to provide an edger that has at least one wheel capable of quick vertical adjustment to compensate for the differences in the heights of the runway upon which the vehicle travels.

More specifically the object of this invention is to provide a quickly adjustable auxiliary wheel for edgers and like.

A still further object of this invention is to provide a wheel support means for edgers or like that permits the lateral sliding adjustment of the wheel support means relative to the frame of the edger or like.

Still further objects of our invention are to provide a vertical and horizontal wheel adjustment for edgers or like that is economical in manufacture and durable in use.

These and other objects will be apparent to those skilled in the art.

Our invention consists in the construction, arrangements, and combination, of the various parts of the device, whereby the objects contemplated are attained as hereinafter more fully set forth, specifically pointed out in our claims, and illustrated in the accompanying drawings, in which:

FIG. 1 is a top plan view of our edger ready for use;
FIG. 2 is a front end view of our device in use and more fully illustrates its construction;
FIG. 3 is a side view of our edger illustrating the vertical adjustment of its auxiliary supporting wheel; and
FIG. 4 is a longitudinal sectional view of the device taken on line 4—4 of FIG. 2.

Although we will describe our invention as particularly adapted for use as an edger, obviously the wheel support means may be used with other devices such as lawn mowers, leaf retrievers or like.

In the drawings we use the numeral 10 to designate the vehicle frame having two rear supporting wheels 11 and 12. The numeral 13 designates a handle means on the rear end of the frame for moving the device in its path of travel. On the frame 10 is the usual prime mover 15 having the power shaft 16. The numeral 17 designates a pulley wheel on the shaft 16. The numeral 19 designates a forwardly extending bearing arm secured to the frame 10 and rotatably supporting at its forward end the shaft 20. The numeral 21 designates a pulley wheel on the shaft 20. The numeral 22 designates an endless belt embracing the pulley wheels 17 and 21. Rotatably mounted in the forward end of the frame 10, extending transversely of its longitudinal axis and rectangular in cross section is the horizontal bar 26. The numeral 27 designates an arcuate bracket on the left forward side of the frame 10 having the notches 29. Hingedly secured to the left end of the shaft 26 is a bar lever 30 capable of selectively engaging any one of the notches 29. The numeral 31 designates a spring clip means for yieldingly holding the lever bar 30 in a direction toward the bracket 27 as shown in FIG. 2. The numeral 32 designates a bearing having a rectangular opening slidably embracing the rectangular bar 26. The numeral 33 designates a handled screw threaded through the bearing 32 and capable of engaging the shaft 26 for detachably securing the bearing member 32 against undesirable accidental sliding movement on the shaft 26. The numeral 35 designates a forwardly extending arm on the bearing 32 and which has a plurality of bolt holes 36. The numeral 37 designates a channel iron arm slidably mounted on the arm 35 and having its forward end extending beyond the forward end of the arm 35. The numeral 39 designates a bolt extending through the arm 37 and selectively through any one of the holes 36 of the arm 35. Rotatably mounted on the forward end of the arm 37 is our auxiliary supporting front wheel 40 as shown in FIG. 3.

The practical operation of the device is as follows:

When the device is to be used on the turf or grass 41 and there is an adjacent curbing 42 between the turf and the main runway 43, the auxiliary front supporting wheel is adjusted as shown in FIG. 2. With the screw handle 33 in loosened condition, the front wheel 40 and its supporting bearing 32 are slid laterally in the desired direction to bring the wheel 40 over the runway upon which it is to travel. After the wheel 40 has been properly positioned, the member 33 is tightened to rigidly hold the bearing 32 against accidental sliding movement. This sliding action is shown by broken lines in FIG. 1. If the curb 42 is sufficiently wide its top surface may be used as the runway for both the wheels 12 and 40. Also, if the runway is not curbed, it is quite possible that all three wheels 11, 12 and 40 will travel on the runway. In many instances, however, the runway 43 will be substantially below that of the top plane of the curb 42 as shown in FIG. 2. When such a condition is encountered, the bar lever 30 is moved laterally outwardly from the notches of the bracket 27 and the shaft 26 rotated to vertically adjust the position of the wheel 40. In most cases it will be a matter of lowering the wheel 40 below that of the wheels 11 and 12. The degree of the lowering of the wheel 40 will be approximately that of the difference in the height of the curb or like 42 above the runway 43. After the wheel 40 has been lowered or raised as the case may be, to the proper position, the bar 30 is released to extend into the appropriate notch 29. With the bar 30 in the appropriate notch 29 the bar 26 will be locked against rotation and the wheel 40 maintained at the proper relative height of travel. Obviously, with the wheel 12 running on the curb 42 and the wheel 40 running on the runway 43, the device will be properly laterally and longitudinally stabilized and the blade 23 will be cutting the turf at the other side of the curb. When the wheel 40 is in such lowered position, it is recommended that it and its supporting unit be slid and positioned on the left hand area of the bar 26. Under certain circumstances it may be desirable to move the wheel further away from or closer to the bar 26 and this is accomplished by sliding the channel arm 35 and choosing the appropriate hole 36 for the bolt 39. Normally the wheel 40 will be substantially as far forward of the frame as is the shaft 20 as shown in FIG. 1.

From the foregoing it will readily be seen that we have provided an edger or like that will operate successfully over various types and shapes of pathways.

Some changes may be made in the construction and arrangement of our turf edger without departing from the real spirit and purpose of our invention, and it is our intention to cover by our claims, any modified forms of structure or use of mechanical equivalents which may be reasonably included within their scope.

We claim:

1. In a turf edger, a frame, a prime mover on said frame, a turf cutting blade operatively connected to said prime mover, at least one first wheel rotatably mounted adjacent one end of said frame, a horizontally disposed shaft at least a portion of which is rectangular in cross section rotatably mounted at the other end of said frame, a bearing member having a rectangular opening slidably embracing said portion of said shaft, an arm extending from said bearing member, a second wheel rotatably mounted adjacent the end of said arm remote from said bearing member, means for selectively holding said shaft in different positions of its rotation relative to said frame, and means for selectively holding said bearing member in different positions of its sliding movement relative to said shaft.

2. In a turf edger, a frame, a prime mover on said frame, a turf cutting blade operatively connected to said prime mover, at least one first wheel rotatably mounted adjacent one end of said frame, a horizontally disposed shaft at least a portion of which is rectangular in cross section rotatably mounted at the other end of said frame, a bearing member having a rectangular opening slidably embracing said portion of said shaft, an arm having at least two slidably engageable members extending from said bearing member, a second wheel rotatably mounted adjacent the end of said arm remote from said bearing member, means for selectively holding said shaft in different positions of its rotation relative to said frame, means for selectively holding said bearing member in different positions of its sliding movement relative to said shaft, and means for selectively holding said slidably engageable members in different positions relative to one another.

3. In a turf edger, a frame, a prime mover on said frame, a turf cutting blade operatively connected to said prime mover, at least one first wheel rotatably mounted adjacent one end of said frame, a horizontally disposed shaft at least a portion of which is rectangular in cross section rotatably mounted at the other end of said frame, a bearing member having a rectangular opening slidably embracing said portion of said shaft, an arm having at least two slidably engageable members extending from said bearing member, a second wheel rotatably mounted adjacent the end of said arm remote from said bearing member, an arcuate bracket having a plurality of notches therein fixedly attached to said frame adjacent one end of said shaft, a lever bar fixedly secured to said shaft and extending radially therefrom to selectively engage any one of said notches for holding said shaft in different positions of its rotation relative to said frame, a manually engageable set screw extending through said bearing member for selectively bearing against said shaft to fix the sliding position of said bearing member relative thereto, and means for selectively holding said slidably engageable members in different positions relative to one another.

References Cited in the file of this patent

UNITED STATES PATENTS

| | | |
|---|---|---|
| 364,735 | Steavens | June 14, 1887 |
| 558,578 | Stewart | Apr. 21, 1896 |
| 717,471 | Tanner | Dec. 30, 1902 |
| 1,043,038 | Alexander | Oct. 29, 1912 |
| 1,333,203 | Coatney | Mar. 9, 1920 |
| 1,963,426 | Taylor | June 19, 1934 |
| 2,489,383 | May | Nov. 29, 1949 |
| 2,791,875 | Faas | May 14, 1957 |
| 2,915,318 | Chesser | Dec. 1, 1959 |
| 2,975,841 | Oehler et al. | Mar. 21, 1961 |